United States Patent
Novo Diaz et al.

(10) Patent No.: US 9,621,617 B2
(45) Date of Patent: Apr. 11, 2017

(54) METHOD AND SERVER FOR SENDING A DATA STREAM TO A CLIENT AND METHOD AND CLIENT FOR RECEIVING A DATA STREAM FROM A SERVER

(75) Inventors: Oscar Novo Diaz, Helsinki (FI); Salvatore Loreto, Helsinki (FI); Heidi-Maria Back, Helsinki (FI)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 300 days.

(21) Appl. No.: 14/380,724

(22) PCT Filed: Feb. 28, 2012

(86) PCT No.: PCT/EP2012/053343
§ 371 (c)(1),
(2), (4) Date: Aug. 24, 2014

(87) PCT Pub. No.: WO2013/127437
PCT Pub. Date: Sep. 6, 2013

(65) Prior Publication Data
US 2015/0350287 A1    Dec. 3, 2015

(51) Int. Cl.
*G06F 15/16* (2006.01)
*H04L 29/06* (2006.01)
*H04L 29/08* (2006.01)

(52) U.S. Cl.
CPC ........ *H04L 65/607* (2013.01); *H04L 65/4084* (2013.01); *H04L 65/608* (2013.01);
(Continued)

(58) Field of Classification Search
CPC ....... H04L 65/607; H04L 67/10; H04L 67/42; H04L 65/4084; H04L 67/12; H04L 65/608
See application file for complete search history.

(56) References Cited

U.S. PATENT DOCUMENTS

| 6,032,200 A | 2/2000 | Lin | |
|---|---|---|---|
| 2012/0079529 A1* | 3/2012 | Harris | H04N 21/47202 725/32 |

FOREIGN PATENT DOCUMENTS

WO    2011/159985 A1    12/2011

OTHER PUBLICATIONS

PCT International Search Report, mailed Sep. 11, 2012, in connection with International Application No. PCT/EP2012/053343 (all pages).

(Continued)

*Primary Examiner* — John B Walsh
(74) *Attorney, Agent, or Firm* — Leffler Intellectual Property Law, PLLC

(57) ABSTRACT

A method is provided, in a server, operatively connectable to a client via a data connection, a method of sending a data stream to the client. The method comprises receiving from the client, a request for data, the request comprising a communication identifier, obtaining a first part of the data stream from a streaming source for sending to the client and sending, to the client, a streaming data message. The streaming data message comprises: the first part, the communication identifier, and a stream indicator, indicating a second data message may follow, comprising a second part of the data stream. The method does not comprise resending the streaming data message if no acknowledgement of receipt has been received from the client. Also a method in a client is provided, as well as the server and the client.

17 Claims, 5 Drawing Sheets

(52) U.S. Cl.
CPC ............. *H04L 67/10* (2013.01); *H04L 67/12* (2013.01); *H04L 67/42* (2013.01)

(56) References Cited

OTHER PUBLICATIONS

Hartke, K. "Observing Resources in CoAP' draft-ietf-core-observe-04", CoRE Working Group, Feb. 14, 2012, pp. 1-25, XP002682647. Retrieved from the Internet: URL:http://tools.ietf.org/pdf/draft-ietf-core-observe-04.pdf.
Shelby, Z. et al. "Constrained Application Protocol (CoAP); draft-ietf-core-coap-07.txt" Internet Engineering Task Force, IETF, Geneva, Switzerland, No. 7, Jul. 8, 2011, pp. 1-86, XP015077108.
Bormann, C. et al. "Blockwise transfers in CoAP; draft-ietf-core-block-04.txt", Internet Engineering Task Force, Geneva, Switzerland, No. 4, Jul. 11, 2011, pp. 1-23, XP015077204.
International Preliminary Report on Patentability, mailed May 28, 2014, in connection with International Application No. PCT/EP2012/053343 (all pages).
Pantos, R. et al. "HTTP Live Streaming; draft-pantos-http-live-streaming-07" IETF Internet Draft, Sep. 30, 2011, pp. 1-33.
Wu, Q. et al. "Problem Statement for HTTP Streaming; draft-wu-http-streaming-optimization-ps-03" Network Working Group, Internet Draft, Oct. 25, 2010, pp. 1-22.
Loreto, S. et al. "Known Issues and Best Practices for the Use of Long Polling and Streaming in Bidirectional HTTP" IETF RFC 6202, Apr. 2011, ISSN: 2070-1721, pp. 1-19.
3GPP TS 26.247 "Transparent end-to-end Packet-switched Streaming Service (PSS); Progressive Download and Dynamic Adaptive Streaming over HTTP (3GP-DASH)", Version 10.0.0, Jun. 2011, pp. 1-94.
"Media Fragments URI 1.0 (basic)" W3C Recommendation; www.w3.org/TR/media-frags/, Sep. 25, 2012, pp. 1-23.

\* cited by examiner

METHOD AND SERVER FOR SENDING A DATA STREAM TO A CLIENT AND METHOD AND CLIENT FOR RECEIVING A DATA STREAM FROM A SERVER

TECHNICAL FIELD

The invention relates to data communication and to communication of a stream of data over a connection between a server and a client, where one or more of the connection, server and client have restricted resources.

BACKGROUND

CoAP—Constrained Application Protocol—is a data communication protocol for constrained nodes and networks. One of the main goals of CoAP is to design a generic web protocol for the special requirements of this constrained environment, especially considering energy, building automation and other M2M—machine to machine-applications. The state of a resource on a CoAP server can change over time. CoAP provides an extension for observing such changes. A client registers itself with a resource by performing a GET request that includes an Observe Option. When a server receives such a request, it services the request like a GET request and, if the resulting response indicates success, establishes an observation relationship between the client and the target resource.

Patent application publication WO 2011/159985 describes a method of exchanging information between sleeping nodes over CoAP.

SUMMARY

It is preferred to dispose of methods and devices for efficient transfer of data streams between said devices, where such devices and/or a connection between them is constrained with respect to resources.

A first aspect provides in a server, operatively connectable to a client via a data connection, a method of sending a data stream to the client. The method comprises receiving from the client, a request for data, the request comprising a communication identifier, obtaining a first part of the data stream from a streaming source for sending to the client and sending, to the client, a streaming data message. The streaming data message comprises: the first part; the communication identifier; and a stream indicator, indicating a second data message may follow, comprising a second part of the data stream. The method does not comprise resending the streaming data message if no acknowledgement of receipt has been received from the client.

By not resending the streaming data message if no acknowledgement of receipt has been received from the client, bandwidth is saved and both client and server architecture can be simplified. On the other hand, it is still possible to transfer a stream of data. In particular if the stream of data comprises real-time relevant data, like audio-visual data from a surveillance system, it is usually more important to have data on time in an efficient way, rather than receiving the data 100% correct, without for example compression/decompression artefacts due to reduced data integrity.

An embodiment of the method according to the first aspect comprises receiving, from the client, a data format request; and sending, in response to receiving the data resource request, to the client a data format message comprising information on at least a first format in which the data stream is available. In this embodiment, the request for data comprises a preferred format comprised by the data format message; and the first part of the stream is formatted in accordance with the preferred format.

By providing an option to choose a specific data format, like a specific codec (coding/decoding) specification, the client can be provided with fewer options with respect to data formats that it can handle. It is also possible that the client chooses a format that the client can handle in the most efficient way taking resources into account, like battery power available.

Another embodiment of the first aspect comprises sending the streaming data message to the client if at least one of the following conditions is met: an amount of data obtained from the streaming source is equal to a pre-determined maximum payload of the streaming data message; or a pre-determined amount of time has lapsed since the last streaming data message has been sent to the client.

This embodiment prevents to large data blocks being sent—which may give rise to certain issues if the network is constrained with respect to quality. Furthermore, by taking into account both options, data messages are sent relatively frequently, so the client receives relatively frequent a sign of life from the server, in any case within the pre-determined amount of time.

A further embodiment of the first aspect comprises receiving no more data from the streaming source; incorporating in the streaming data message an end of stream indicator; and sending the streaming data message to the client.

This enables the client to differentiate between a connection terminated correctly and a connection terminated due to an error.

In yet another embodiment of the first aspect, the streaming data message is sent in accordance with a communication protocol specification, the specification providing: sending of messages that require to be confirmed upon receipt; and ending of messages that are not to be confirmed upon receipt. In this embodiment, the streaming data message is sent as a message that is not to be confirmed upon receipt.

By sending messages that do not need to be confirmed, no confirmation has to be sent upon receipt of the data message. This reduces overhead bandwidth used over the connection and allows simplification of the network architecture.

A second aspect provides, in a client, operatively connectable to a server via a data connection, a method of receiving a data stream from the server. The method comprises obtaining a communication identifier, sending, to the server, a request for data, the request comprising the communication identifier and receiving from the server a streaming data message. The data message comprises a first part of the data stream; the communication identifier; and a stream indicator, indicating a second data message may follow, comprising a second part of the data stream. The method further comprises processing the streaming data message without sending an acknowledgement of receipt to the server.

As with the method according to the first aspect, this allows for efficient transfer of a stream of data and provides an option for simplified system architecture.

In an embodiment of the second aspect, the streaming data message comprises a timestamp having a timestamp value. The method of this embodiment comprises extracting the timestamp from the streaming data message; storing the streaming data message in a buffer; and processing the streaming data message together with other streaming data messages stored in the buffer in an order indicated by the values of the timestamps corresponding to each streaming data message.

Data messages may not arrive in the same order as they may take different routes from the server to the client. This is for example the case with IP based networks. This embodiment allows proper ordering for further processing.

A further embodiment of the second aspect comprises receiving a further streaming data message comprising a further timestamp with a further value; and discarding the further streaming data message if the streaming data message has already been processed and the further value of the further timestamp corresponds to an earlier time than the value of the timestamp of the streaming data message.

With this embodiment, real time constraints are given priority over data integrity constraints. In particular in security environments, real time demands are usually more important than data integrity constraints.

A third aspect provides a server for sending a data stream to a client via a data connection, comprising: a stream receiving unit arranged to obtain a first part of the data stream from a streaming source for sending to the client. The server further comprises a processing unit arranged to generate data messages, a receiving unit arranged to receive, from the client, a request for data, the request comprising a communication identifier; a sending unit arranged to send the data messages to the client. The processing unit is arranged to generate a streaming data message comprising: the first part; the communication identifier; and a stream indicator, indicating a second data message may follow, comprising a second part of the data stream. The processing is further arranged not to instruct the sending unit to resend the streaming data message if no acknowledgement of receipt has been received from the client.

A fourth aspect provides a client for receiving a data stream from a server via a data connection, comprising: a processing unit arranged to obtain a communication identifier; a sending unit arranged to send to the server, a request for data, the request comprising the communication identifier and a receiving unit. The receiving unit is arranged to receive, from the server, a streaming data message comprising: a first part of the data stream; the communication identifier; and a stream indicator, indicating a second data message may follow, comprising a second part of the data stream. The processing unit is arranged to process the streaming data message without sending an acknowledgement of receipt to the server.

BRIEF DESCRIPTION OF THE DRAWINGS

The various aspects and embodiments thereof will now be discussed in further details in conjunction with Figures. In the Figures.

DETAILED DESCRIPTION

Figure 1:
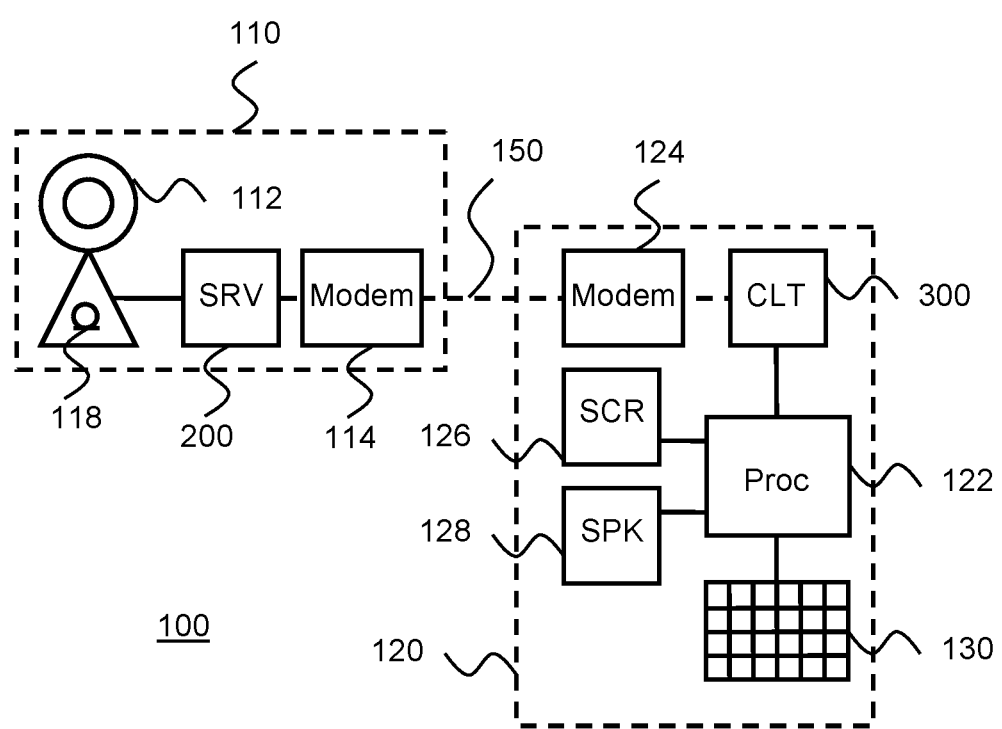
FIG. 1: shows a communication system.

FIG. 1 shows a communication system 100 comprising a remote surveillance module 110 and a mobile telephone 120. The remote surveillance module 110 comprises a camera 112, a microphone 118, a server 200 and a server modulator/demodulator 114. It is assumed that the camera 112 acquires data to create a stream of audiovisual data. This may be in a continuous way, but also in a non-continuous way. In the latter case, the camera 112 may be triggered by motion sensor or a remote or local instruction. The server modulator/demodulator 114 modulates data from the server for transmission over a data connection 150 and demodulates data received. Modulation may comprise signal modulation of a data signal on a carrier wave for wired or wireless transmission, data modulation for sending in accordance with a data transmission protocol like TCP/IP or other.

The mobile telephone 120 comprises a client modulator/demodulator 124, a client 300, a screen 126 for presenting visual data, a speaker 128 for presenting audible data, a keypad 130 for data receiving input and a processing unit 122 for controlling the operation of the various parts of the mobile telephone 120. The screen 126 may be a touch screen for receiving data input.

The remote surveillance module 110 and the mobile telephone 120 are connected via the data connection 150. The data connection 150 may be a wired connection, a wireless connection or a combination thereof. Further, the connection may be a direct connection or a connection via a larger network, including, but not limited to, a cellular network, an IP network, other, or a combination thereof. A person skilled in the art will appreciate that the data connection 150 is not necessarily a fixed and physical connection and may also be a logical connection. The preferred format for communication between the client 300 and the server 200 is CoAP, which is an abbreviation of Constrained Application Protocol.

Figure 2:
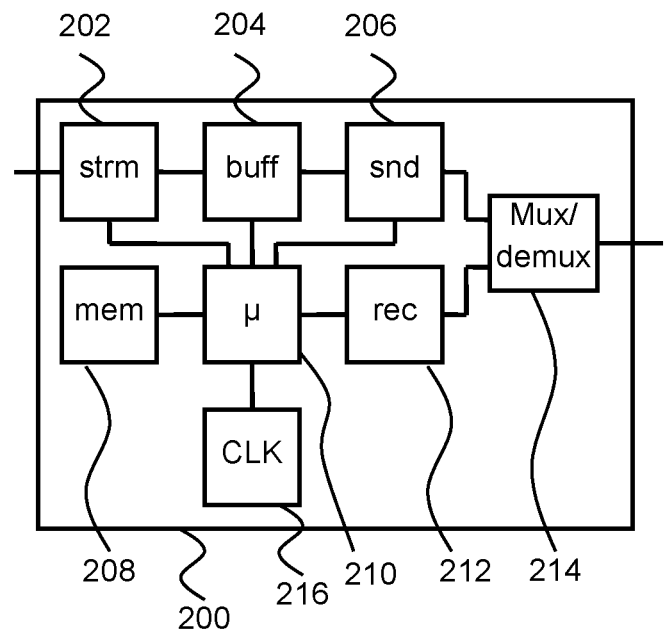
FIG. 2: shows a server.

FIG. 2 shows the server 200 in more detail. The server 200 comprises a server stream processing circuit 202 for receiving and processing a stream, a server buffer 204 for buffering the received stream, a server sending circuit 206 for sending data from the received stream, a server processing circuit 210 for controlling operation of the components of the server 200, a server memory 208, a server receiving circuit 212 for receiving data, a server multiplexer/demultiplexer 214 for separating data to be sent and data received via the server modulator 114 and a clock unit 216. The server memory 208 is arranged for storing instructions for programming the server processing circuit 210, for storing data received by means of the server receiving circuit 212 and for storing other data related to the operation of the server 200.

Figure 3:
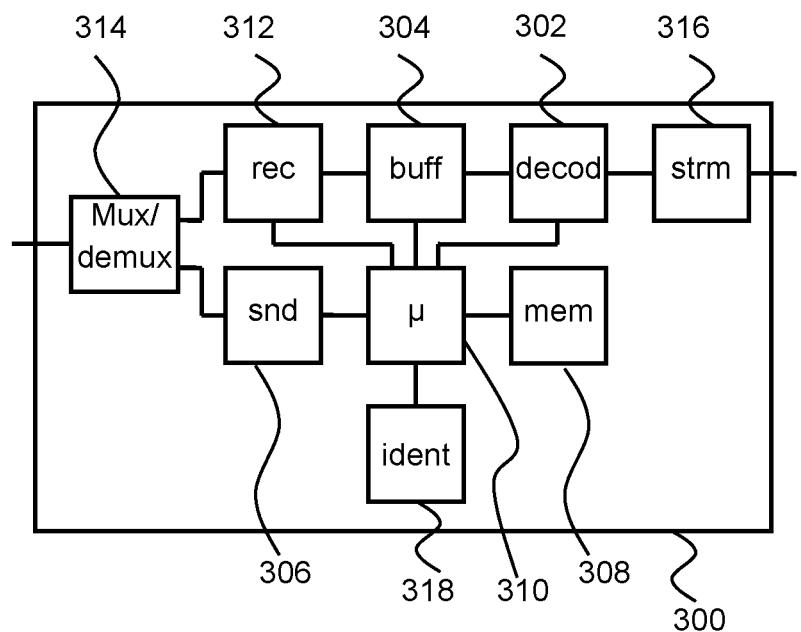
FIG. 3: shows a client.

FIG. 3 shows the client 300 in more detail. The client 300 comprises a client multiplexer/demultiplexer 314 for separating data to be sent and data received via the server modulator/demodulator 114, a client receiving circuit 312 for receiving data comprising stream data, a client buffer 304, a client decoder 302, a client stream processing circuit 316, a client sending circuit 306 for sending for sending data messages, a client processing circuit 310 for controlling operation of the components of the client 300, a client memory 308 and an identifier generation circuit 318 for generating a communication identifier. The client memory 308 is arranged for storing instructions for programming the client processing circuit 310, for storing data received by means of the client receiving circuit 312 and for storing other data related to the operation of the client 300.

Figure 4:
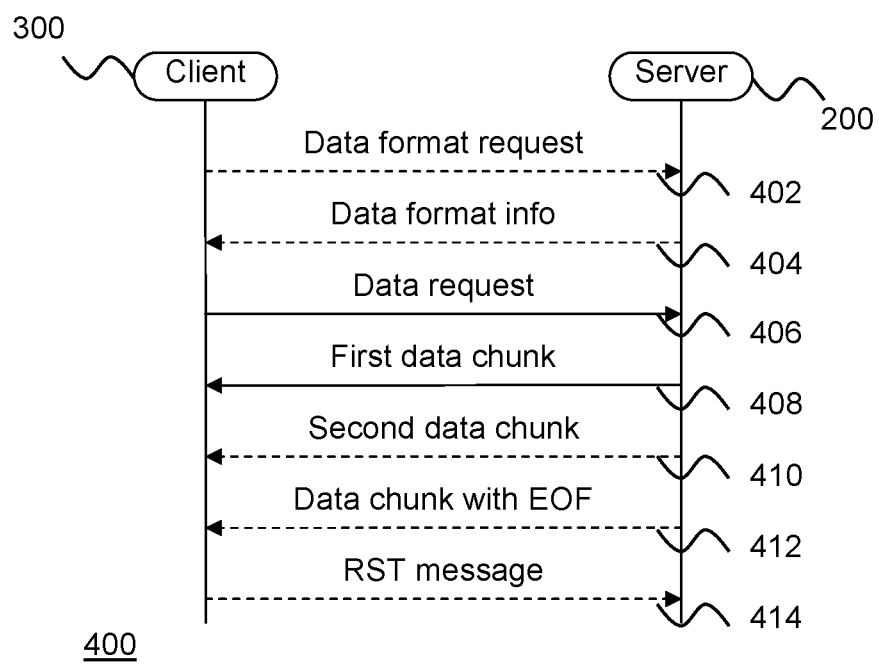
FIG. 4: shows a protocol diagram.
Figure 5:
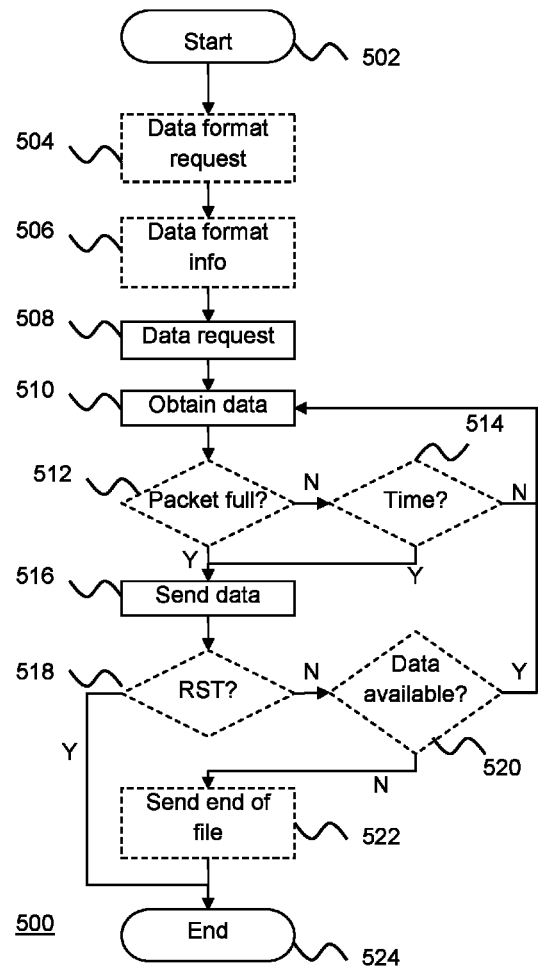
FIG. 5: shows a server procedure.
Figure 6:
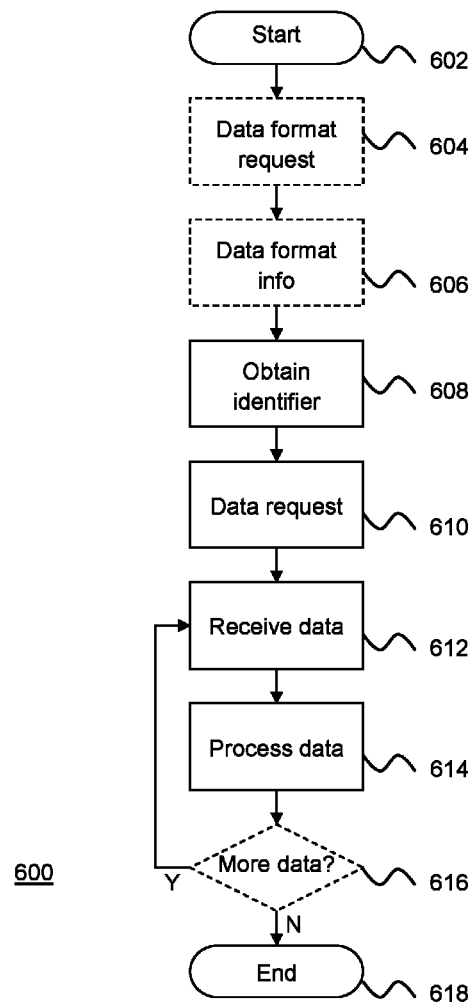
FIG. 6: shows a client procedure.

The operation of the communication system 100 comprising the remote surveillance module 110 and the mobile telephone 120 will now be discussed in conjunction with FIG. 4 showing a protocol diagram 400, FIG. 5 showing a server procedure 500 and FIG. 6 showing a client procedure 600.

FIG. 4 depicts in the protocol diagram 400 on the left side the client 300 and on the right side the server 200. Transferring of data related to a data stream starts with an optional data format request 402 issued by the client 300 in step 604—executed after starting the client procedure 600 in a client starting point 602. The data format request 402 is received by the server 200 in step 504—executed after starting the server procedure 500 in a server starting point 502. With the data format request 402, the client 300 asks the server 200 in what formats the stream of audiovisual data may be provided. In CoAP syntax, the data format request may be GET/videocamera/codecs In a step 506, the server 200 sends a data format information message 404 to the client 300 that receives the data format information message in step 606. The data format information message 404 comprises in a preferred embodiment codecs (coding/decoding protocols) and in particular codecs for compression and decompression of audiovisual data like various MPEG standard specifications, DivX, AVI, 3GP and other. In another embodiment, the codecs on which information is comprised by the data format information message 404 are encryption/decryption codecs. Other types of formats may be communicated as well, on formats related to the application layer, but also on formats related to lower layers.

In CoAP syntax, the data format information message 404 may be as follows:

2.05 Content
</videocamera/MPEG>; rt="videocamera"
</videocamera/AVI>; rt="videocamera"

With the data format information message 404, the server 200 informs the client 300 that the stream of audiovisual data obtained by means of the camera 112 can be provided in a compressed format, compressed in accordance with either an MPEG compression specification or an AVI compression specification.

Having received information on the formats in which the data stream—in this case a stream comprising audiovisual data—is available, the client 300 prepares a request for data. In a step 608, the client 300 obtains an identifier for a communication session with the server 200. In this embodiment, the identifier generation circuit 318 generates a random session identifier or token. Alternatively, the client memory 308 has a table with identifiers stored in it and the client processing circuit 310 selects one of those identifiers from the table.

The identifier obtained is incorporated in a data request message 406, by which the client 300 requests the server 200 for data from the data stream generated by the camera 112 and/or the microphone 118. The data request message 406 is compiled by the client processing circuit 310. The data request message 406 is sent by the client 300 in a step 610 by means of the client sending circuit 306 and channelled to the client modulator/demodulator 124 via the client multiplexer/demultiplexer 314, as with other data sent by the client 300. The data request message 406 is received by the server 200 in a step 508 via the server modulator/demodulator 114 and channelled to the server processing circuit 210 via the server multiplexer/demultiplexer 214, as with other data received by the server 200.

In CoAP syntax, the data request message 406 may be as follows:

GET/videocamera/MPEG
Observe: 0
Token: 0x4a

Upon receiving the data request message 406, the server obtains in a step 510 data generated by the camera 112 and/or the microphone 118 as a data stream. The data is obtained by the server via the server stream processing circuit 202. The server stream processing circuit 202 may act as a pass-through gate. Alternatively, the server stream processing circuit 202 is or may act as a data compression unit, a data encryption unit, a unit processing the data stream in another way, or a combination thereof. Such processing is preferably done in accordance with the format specification as requested in the data request message 406. In a preferred embodiment, the server stream processing circuit translates the data in the data stream, either processed or not, to plain text data specified as "text/plain; charset=utf-8".

In another embodiment, the data is sent in a pre-determined format, without further negotiations between the client 300 and the server 200 in advance. In that embodiment, the option for requesting data formats is not available. In another embodiment, if no specific data format is requested by the client 300 or if no data format request has been issued, the server 200 sends data in a default format.

The obtained and optionally processed data is provided to the server buffer 204. The server processing circuit 210 checks in a decision 512 whether data for a full data packet is ready for sending a chunk of stream data to the client 300. A packet is considered full if the amount of data of the data stream in the buffer equals and preferably not exceeds a pre-determined amount of data. The pre-determined amount of data may be defined by a standard specification, by negotiation between the client 300 and the server 200, other, or a combination thereof. In a preferred embodiment, the pre-determined amount is 1280 bytes.

If the packet is not full, the server processing circuit 210 optionally checks in a decision 514 whether a pre-determined amount of time has lapsed since the data request message 406 has been received. The pre-determined amount of time may be defined by a standard specification, by negotiation between the client 300 and the server 200, other, or a combination thereof. Ultimately, this may result in sending a data packet with no pay-load. However, it does assure that the client 300 receives a sign of life from the server 200.

If data in the server buffer 204 meets one of the pre-determined criteria on data amount and time discussed above, a first chunk of data 408—which may be equal to zero, as explained—is sent in a step 516 by the server 200 from the server buffer 204 via the server sending circuit 206 and the server multiplexer/demultiplexer 214 to the client 300 over the data connection 150. The data chunk 408 is sent in a data message that may have the following structure in CoAP syntax:

2.05 Content
Observe: 1
Token: 0x4a
Streaming: chunked
Payload: first chunk

In this embodiment, the Streaming parameter indicated above provides information that the payload data is part of a larger data entity and, in this embodiment, a stream in particular. By the indication that the payload is a chunk of a larger entity, the client 300 recognises that more data is to follow. In other embodiments, either still within the CoAP protocol or another protocol, another parameter and value thereof may be used to indicate that the stream of audiovisual data—or other larger data entity—is taken apart in data chunks.

The full data message with the first data chunk 408 is sent to the client in a step 516. The full data message of this embodiment as detailed above thus comprises a timestamp "Observe", a random session identifier or token "0x4a", an encoding parameter "chunked" and payload. A value for the timestamp may be obtained from the clock unit 216. The full data message May also comprise further data like routing or addressing data. Preferably, consecutive data messages are provided with timestamps in a consecutive and continuous way: a first data message or packet has "Observe" value 1, a second data message has "Observe" value 2 and so on.

The data message is received by the client 300 in a step 612 via the client modulator/demodulator 124, the client multiplexer/demultiplexer 314 forwarding the data message and the client receiving circuit 312 for receiving the data message. The client receiving circuit 312 takes the payload from the data message, the first data chunk 408 and forwards the first data chunk 408 to the client buffer 304 in a step 614.

The client buffer 304 provides data to the client decoder 302 for decoding the first data chunk 408 in the step 614 as well. The decoding may be decompression, decryption, other, or a combination thereof. The decoded data is subsequently provided to the client stream processing circuit 316 for rendering the decoded data for reproduction by the screen 126 and/or the speaker 128 in a format consumable by a person. The reproduction may be controlled by a user by means of keypad 130 and/or the screen 126 in case available as a touch screen.

With certain data communication protocols, like UDP (User Datagram Protocol), data messages or packets may be received in an order different from an order in which the data messages have been sent. By means of the timestamp discussed above, data messages can be retrieved from the client buffer 304 in a correct order, i.e. the order in which they have been sent. This allows the client 300 to verify whether no data messages with chunks of the data stream have been lost of delayed.

In such data communication protocols, the transmission time of data messages from the server 200 to the client 300 may vary. In a particular case, transmission time may vary such that a data message with timestamp 10 has not yet arrived at a moment that further data messages with timestamps 11 and 12 have already arrived and another data message with timestamp 9 has already been retrieved from the client buffer 304 and processed.

In particular in cases where timely processing of data is more important than data integrity, data in the further data messages with timestamps 11 and 12 is processed after the data of the other data message with timestamp 9 and the data message with timestamp 10 is discarded upon arrival. Alternatively, processing of data in the further data messages with timestamps 11 and 12 is suspended until the data of the data message with timestamp 10 has arrived and has been processed. In again another alternative, data in the further data messages with timestamps 11 and 12 is processed, followed by processing of data comprised by the data message with timestamp 10.

The reception of the data message is not acknowledged by the client 300. This is to reduce use of bandwidth, making as much bandwidth of the data connection 150 as possible available for transmission of the actual data of the stream of audiovisual information. In an embodiment related to CoAP, the server 200 has an option to send data chunks in either confirmable or non-confirmable messages. To reduce bandwidth as indicated, data chunks of the data stream are sent by the server 200 by sending data in chunks by means of non-confirmable messages.

The server procedure 500 continues with another step having sent the data message, without waiting for acknowledgement of receipt of the data message from the client 300. One reason is to make, as already indicated, as much bandwidth available as possible. Another reason is that with audiovisual data and "live" audiovisual in particular, it is more important that data is at the right place in time, rather than that all data is at the right place in good shape, but with a significant delay. And in some constrained scenarios, the quality of the data connection 150 may be a constraint—in which case resending data to get the data with 100% integrity with the client 300 may take a lot of times, clogging the constrained connection.

Having sent the first data chunk 408 in step 516, the server procedure 500 continues to a decision 518 in which is checked whether the client 300 has reset the communication session with the server 200 by sending a reset message 414 or not. If the client 300 has reset the communication session with the server 200, no more data needs to be sent to the client 300. In case a reset message has been received by the server 200, the server procedure ends in a terminator 524.

If in decision 518 it is detected that not reset message 414 has been received by the server 200, the server procedure continues by checking whether more data of the data stream is available. If no more data is available, for example when the camera 112 and/or the microphone 118 are not active anymore, the server sends an end of file message 412 in a step 522. Such end of file message 412 allows or at least helps the client 300 to differentiate between a connection terminated as a result of an error and a correction being terminated correctly. In CoAP syntax, the end of file message 404 may be as follows:

2.05 Content
Observe: 44
Token: 0x4a
Streaming: EOF
Payload: last chunk

Having sent the end of file message, the server 200 continues the server procedure 500 to a terminator 524, ending the server procedure 500.

If it is in the decision 520 it is detected that data is still available and presented by the camera 112 and/or the microphone 118, the server procedure 500 jumps back to the step 510 for obtaining further data from the stream, and sending a second data chunk 410 in the step 516, following also optional steps and decisions in between. This loop is continued until the server procedure 500 branches to the terminator 524, either directly or via optional intermediate steps and decisions.

As to the client procedure 600, having processed the data chunk received, the client 300 checks in a decision 616 whether more data has been received form or is being offered by the server 200. This may be checked by the client receiving circuit 312, the client multiplexer/demultiplexer 314, the client processing circuit 310, another component of the client 300 or a combination thereof. If no data has been received anymore, the client procedure 600 continues to a terminator 618, ending the client procedure 600. Alternatively, if the last data message received from the server 200 carries the "end of file" identifier, the client procedure 600 branches to the terminator 618 as well. If it is detected in the decision 616 that further data has been received or is to be received by the client 300 from the server 200, the client procedure 600 branches back to the step 612.

The various embodiments thus depicted, described and discussed are particularly advantageous as an extension of the CoAP protocol. And, as a person skilled in the art will appreciate, these embodiments and equivalents thereof, either with or without small variations, may be employed in other data communication protocols as well without departing from the scope of the invention.

In the embodiments presented so far, the server 200 has been implemented in the remote surveillance module 110 and the client 300 has been implemented in the mobile telephone 120. These are merely exemplary embodiments; the server 200 may also be implemented in a laboratory measurement module, providing a continuous or semi-continuous feed of measurement data. In such scenario, the client 300 may still be implemented in the mobile telephone 120. In another alternative, the server 200 is implemented in a traffic monitoring module and the client 300 is implemented in a traffic control module, controlling adaptive road signs.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa. When data is being referred to as audiovisual data, it can represent audio only, video only or still pictures only or a combination thereof, unless specifically indicated otherwise in the description of the embodiments.

In the description above, it will be understood that when an element such as layer, region or substrate is referred to as being "on", "onto" or "connected to" another element, the element is either directly on or connected to the other element, or intervening elements may also be present.

Furthermore, the invention may also be embodied with less components than provided in the embodiments described here, wherein one component carries out multiple functions. Just as well may the invention be embodied using more elements than depicted in FIG. 1, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. In a server, operatively connectable to a client via a data connection, a method of sending a data stream to the client, comprising:
  receiving, from the client, a data format request;
  sending, in response to receiving the data resource request, to the client a data format message comprising information on at least a first format in which the data stream is available;
  receiving, from the client, a request for data, the request comprising a communication identifier;
  obtaining a first part of the data stream from a streaming source for sending to the client;
  sending, to the client, a streaming data message comprising:
    the first part;
    the communication identifier; and
    a stream indicator, indicating a second data message may follow, comprising a second part of the data stream; and
  not resending the streaming data message if no acknowledgement of receipt has been received from the client;
  wherein:
    the request for data comprises a preferred format comprised by the data format message; and
    the first part of the stream is formatted in accordance with the preferred format.

2. The method according to claim 1, comprising sending the streaming data message to the client if at least one of the following conditions is met:
  an amount of data obtained from the streaming source is equal to a pre-determined maximum payload of the streaming data message; and
  a pre-determined amount of time has lapsed since the last streaming data message has been sent to the client.

3. The method according to claim 1, further comprising:
  receiving, from the client, a no more data message; and
  stopping sending data to the client.

4. The method according to claim 1, further comprising:
  receiving no more data from the streaming source;
  incorporating in the streaming data message an end of stream indicator; and
  sending the streaming data message to the client.

5. The method according to claim 1, wherein the data stream comprises audiovisual data.

6. The method according to claim 1, wherein the streaming data message is sent in accordance with a communication protocol specification, the specification providing:
  sending of messages that require to be confirmed upon receipt; and
  sending of messages that are not to be confirmed upon receipt; and
  wherein the streaming data message is sent as a message that is not to be confirmed upon receipt.

7. The method according to claim 1, further comprising:
  obtaining a timestamp corresponding to a system time of the server; and
  inserting the timestamp in the streaming data message.

8. The method according to claim 1, wherein the request for data and the streaming data message are provided in accordance with the CoAP protocol.

9. In a client, operatively connectable to a server via a data connection, a method of receiving a data stream from the server, the method comprising:
  sending a data format request to the server;
  receiving, from the server, a data format message comprising information on at least a first format in which the data stream is available;
  obtaining a communication identifier;
  sending, to the server, a request for data, the request comprising the communication identifier;
  receiving from the server a streaming data message comprising:
    a first part of the data stream;
    the communication identifier; and
    a stream indicator, indicating a second data message may follow, comprising a second part of the data stream; and
  processing the streaming data message without sending an acknowledgement of receipt to the server,
  wherein:
    the request for data comprises a preferred format comprised by the data format message; and
    the first part of the stream is formatted in accordance with the preferred format.

10. The method according to claim 9, wherein the streaming data message comprises a timestamp having a timestamp value and the method further comprises:
  extracting the timestamp from the streaming data message;

storing the streaming data message in a buffer; and
processing the streaming data message together with other streaming data messages stored in the buffer in an order indicated by the values of the timestamps corresponding to each streaming data message.

11. The method according to claim 10, further comprising:
receiving a further streaming data message comprising a further timestamp with a further value; and
discarding the further streaming data message if the streaming data message has already been processed and the further value of the further timestamp corresponds to an earlier time than the value of the timestamp of the streaming data message.

12. A server for sending a data stream to a client via a data connection, comprising:
a stream receiving unit arranged to:
receive, from the client, a data format request;
send, in response to receiving the data resource request, to the client a data format message comprising information on at least a first format in which the data stream is available; and
obtain a first part of the data stream from a streaming source for sending to the client;
a processing unit arranged to generate data messages;
a receiving unit arranged to receive, from the client, a request for data, the request comprising a communication identifier;
a sending unit arranged to send the data messages to the client;
wherein:
the processing unit is arranged to generate a streaming data message comprising:
the first part;
the communication identifier; and
a stream indicator, indicating a second data message may follow, comprising a second part of the data stream; and
the processing unit is arranged not to instruct the sending unit to resend the streaming data message if no acknowledgement of receipt has been received from the client;
the request for data comprises a preferred format comprised by the data format message; and
the first part of the stream is formatted in accordance with the preferred format.

13. A communication system comprising:
the server according to claim 12;
the client for receiving the data stream from the server via the data connection, wherein the client comprises:
a processing unit arranged to obtain the communication identifier;
a sending unit arranged to:
send, to the server, the data format request; and
send to the server, the request for data, the request comprising the communication identifier;
a receiving unit, arranged to:
receive, from the server, a data format message comprising information on at least a first format in which the data stream is available,
receive, from the server, the streaming data message comprising:
the first part of the data stream;
the communication identifier; and
the stream indicator, indicating the second data message may follow, comprising the second part of the data stream; and
wherein:
the processing unit is arranged to process the streaming data message without sending the acknowledgement of receipt to the server; and
the communication system further comprises:
the data connection.

14. A client for receiving a data stream from a server via a data connection, comprising:
a processing unit arranged to obtain a communication identifier;
a sending unit arranged to:
send, to the server, a data format request; and
send to the server, a request for data, the request comprising the communication identifier;
a receiving unit, arranged to:
receive, from the server, a data format message comprising information on at least a first format in which the data stream is available,
receive, from the server, a streaming data message comprising:
a first part of the data stream;
the communication identifier; and
a stream indicator, indicating a second data message may follow, comprising a second part of the data stream; and
wherein:
the processing unit is arranged to process the streaming data message without sending an acknowledgement of receipt to the server;
the request for data comprises a preferred format comprised by the data format message; and
the first part of the stream is formatted in accordance with the preferred format.

15. The client according to claim 14, further comprising a communication identifier generator unit, wherein the processing unit is arranged to obtain the communication identifier from the communication identifier generator unit.

16. A mobile telephone comprising the client according to claim 14 and wherein the stream comprises audiovisual data, the mobile telephone further comprising at least one audiovisual reproduction unit for rendering the processed data comprised by the stream.

17. The mobile telephone according to claim 16, wherein the at least one audiovisual reproduction unit comprises at least one of the following:
a speaker; and
a display.

* * * * *